US008769346B2

(12) United States Patent
Sijelmassi

(10) Patent No.: US 8,769,346 B2
(45) Date of Patent: Jul. 1, 2014

(54) METHOD AND APPARATUS FOR ADAPTIVE DECLARATIVE MONITORING

(75) Inventor: Rachid Sijelmassi, Chevy Chase, MD (US)

(73) Assignee: CA, Inc., Islandia, NY (US)

( * ) Notice: Subject to any disclaimer, the term of this patent is extended or adjusted under 35 U.S.C. 154(b) by 126 days.

(21) Appl. No.: 12/274,930

(22) Filed: Nov. 20, 2008

(65) Prior Publication Data
US 2009/0177929 A1 Jul. 9, 2009

Related U.S. Application Data

(60) Provisional application No. 60/989,757, filed on Nov. 21, 2007.

(51) Int. Cl.
*G06F 11/00* (2006.01)

(52) U.S. Cl.
USPC .......................................... 714/47

(58) Field of Classification Search
USPC .......................................... 714/47
See application file for complete search history.

(56) References Cited

U.S. PATENT DOCUMENTS

| | | | |
|---|---|---|---|
| 5,787,409 A * | 7/1998 | Seiffert et al. ............... 706/45 |
| 6,393,387 B1 * | 5/2002 | Adriaans et al. ............ 703/27 |
| 6,966,015 B2 * | 11/2005 | Steinberg et al. .......... 714/47.2 |
| 7,130,770 B2 * | 10/2006 | Di Palma et al. ........... 702/186 |
| 7,194,543 B2 * | 3/2007 | Robertson et al. .......... 709/226 |
| 7,254,750 B1 * | 8/2007 | Okun et al. ................ 714/47.2 |
| 7,260,743 B2 * | 8/2007 | Fellenstein et al. ......... 714/26 |
| 7,293,201 B2 * | 11/2007 | Ansari ...................... 714/38.14 |
| 7,490,073 B1 * | 2/2009 | Qureshi et al. ............. 706/50 |
| 7,523,357 B2 * | 4/2009 | Irby et al. .................. 714/47.2 |
| 7,539,907 B1 * | 5/2009 | Johnsen et al. ............ 714/47.2 |
| 7,549,077 B2 * | 6/2009 | White et al. ................ 714/4.12 |
| 7,757,120 B2 * | 7/2010 | Ogle et al. ................. 714/26 |
| 7,788,536 B1 * | 8/2010 | Qureshi et al. ............ 714/38.14 |
| 7,802,144 B2 * | 9/2010 | Vinberg et al. ............. 714/37 |
| 7,806,143 B2 * | 10/2010 | Taskar ....................... 137/884 |
| 7,941,706 B2 * | 5/2011 | Yuasa et al. ............... 714/47.1 |
| 8,024,608 B2 * | 9/2011 | Greenlee et al. ............ 714/25 |
| 8,024,772 B1 * | 9/2011 | Yehuda et al. ............. 726/1 |
| 8,069,374 B2 * | 11/2011 | Panigrahy et al. .......... 714/38.1 |
| 8,180,724 B1 * | 5/2012 | Qureshi et al. ............ 706/50 |
| 8,266,478 B2 * | 9/2012 | Fan et al. ................... 714/26 |
| 2003/0135382 A1 * | 7/2003 | Marejka et al. ............ 705/1 |
| 2004/0164206 A1 * | 8/2004 | Jammu et al. .............. 246/167 R |
| 2005/0125688 A1 * | 6/2005 | Ogawa et al. .............. 713/200 |
| 2007/0168493 A1 * | 7/2007 | Sarwono et al. ........... 709/224 |
| 2009/0249129 A1 * | 10/2009 | Femia ......................... 714/47 |
| 2009/0313508 A1 * | 12/2009 | Yan et al. ................... 714/47 |
| 2010/0031090 A1 * | 2/2010 | Bernardini et al. ........ 714/38 |
| 2012/0124410 A1 * | 5/2012 | Chun et al. ................. 714/2 |

* cited by examiner

*Primary Examiner* — Amine Riad
(74) *Attorney, Agent, or Firm* — Myers Bigel Sibley & Sajovec, P.A.

(57) ABSTRACT

A method of and apparatus for monitoring a computer system includes defining a monitoring policy for the computer system. At least one computer is employed to determine a status of a state of the computer system relative to the monitoring policy. At least one computer is employed to determine a condition of at least one monitored element to be monitored in the computer system based on the status of the state of the computer system. Furthermore, at least one computer is employed to monitor the condition of the at least one monitored element in the computer system, based on the monitoring policy. At least one computer is employed to perform an action in response to the condition assuming a predetermined status.

28 Claims, 3 Drawing Sheets

METHOD AND APPARATUS FOR ADAPTIVE DECLARATIVE MONITORING

CROSS-REFERENCE TO RELATED APPLICATION

This application is based on and derives the benefit of the filing date of U.S. Provisional Patent Application No. 60/989,757, filed Nov. 21, 2007. The entire content of this application is herein incorporated by reference in its entirety.

FIELD OF THE INVENTION

The present disclosure relates to monitoring systems in general and, more particularly, to methods and apparatus for monitoring a system and automatically taking steps to remedy problems in the system without intervention from a user.

DETAILED DESCRIPTION OF SEVERAL EMBODIMENTS

Figure 1:
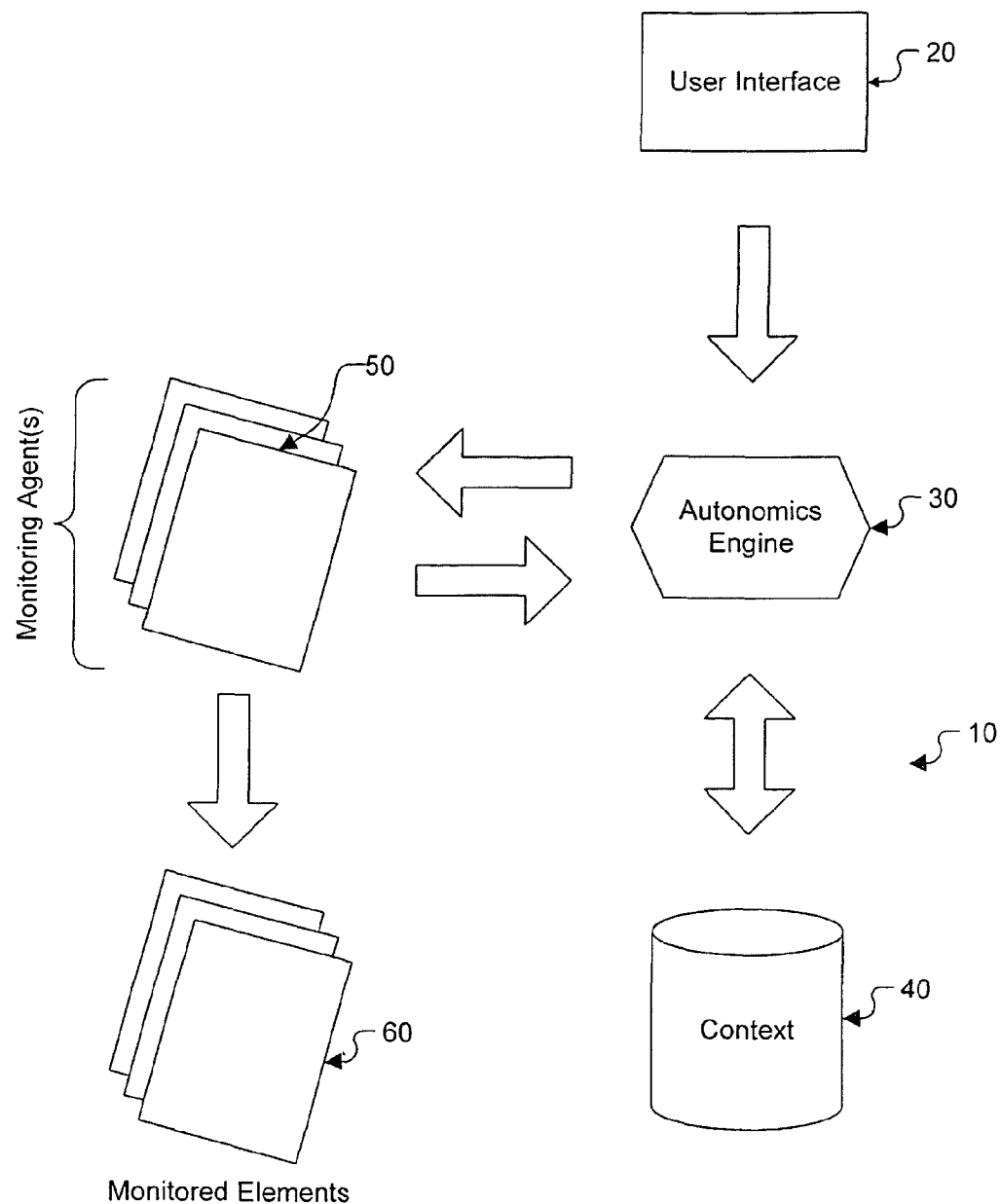
FIG. 1 illustrates a schematic diagram of a declarative adaptive monitoring system according to an embodiment.

FIG. 1 illustrates an adaptive monitoring system 10 that enables autonomies. Autonomics is the ability to monitor a system, attend to issues discovered by the monitoring, and fix the discovered issues automatically, i.e., without user intervention. System 10 includes a user interface 20, an autonomies engine 30, a context 40, monitoring agent 50, and monitored elements 60.

Generally, user interface 20 enables entry of policies to monitor the overall state of a system. Autonomics engine 30 receives these policies from user interface 20, and transforms the policies into monitoring requirements. These monitoring requirements may identify the elements to be monitored to implement these policies, the possible states of these monitored elements, and the actions to be triggered given the current state of the monitored element and the requirement at hand. In order to perform these functions, autonomics engine 30 may interact with context 40 and monitoring agent 50. Context 40 may store rules related to the monitoring requirements, configuration information related to the system, and/or data collected from monitored elements. Autonomics engine 30 may have bidirectional communication with context 40 to exchange this kind of information. Furthermore, autonomics engine 30 may communicate with monitoring agent 50 to ensure that appropriate elements of the system are being monitored as per the policies entered through user interface 20.

Based on the information supplied by autonomics engine 30, monitoring agent 50 monitors the condition of the monitored elements 60 and reports back on the monitored condition to autonomics engine 30. If the state of the system is not normal, autonomics engine 30 may execute remedial actions. Thus, autonomics engine 30 may use policies entered through user interface 20 to turn system 10 into a self-managed, self healing system.

In an embodiment, the system to be monitored may be a computer system. The computer system may include hardware that is a combination of one or more servers, routers, switches, hubs, repeaters, and other such networking equipment. In addition, the computer system may also include a combination of application level and system level software running on the hardware. In an embodiment, user interface 20 may be used by a network administrator, network designer, or any other such person or group of persons involved in the maintenance of the system.

User interface 20 may be used to enter overall system states by making "statements." The type of statements made by the user would depend on the type of system being monitored. For example, if a computer system is being monitored, user interface 20, may be used by a network administrator to enter a "statement", such as, for example, the following:

Web tier of application X is saturated if the total number of concurrent connections serviced by web servers in some group exceeds some threshold for at least 5 minutes.

Web server in some group is under used if current number of connections is less than 100 for 10 minutes.

In addition to the statements above, a user may also define actions that may be taken by system 10 in the event a condition in the statement is met. For example, a user may define the following actions that need to be taken based on the statements above:

When web tier of application X is saturated, run a remediation workflow to provision a new virtual machine.

When web tier is not saturated un-provision 20% of the web servers that are under used.

When a web tier server is under used accept new connections to it.

A user may define the above-mentioned actions through user interface 20. Furthermore, these actions, like the statements above, may be defined by the user in a natural language such as, for example, English or some sort of pseudo code.

Autonomics engine 30 may accept statements and actions such as those mentioned above, and translate each of these statements and actions into monitoring agents 50 which monitor monitored elements 60 on specific computers. For example, in an embodiment, monitored elements 60 would be the web tier of application X and a web server. In addition, autonomics engine 30 may define the conditions that need to be monitored. For example, based on the statements mentioned above, the conditions to be monitored are the number of concurrent connections serviced by web servers in a group for a set period of time.

Based on the statements and actions entered through user interface 20, autonomies engine 30 may create autonomic rules also known as Action Rules that take action on the system. These Action Rules are the statements and actions defined by a user in a natural language that are converted into executable code by autonomics engine 30.

Thus, a combination of states, rules and actions, termed a policy, can essentially turn an application into a self-managed, self healing system. Autonomics engine 30 is responsible for deriving and consolidating the monitoring requirements resulting from multiple active management policies and for distributing them to monitoring agents 50. Monitoring agents 50 in turn monitor monitored elements 60 based on information obtained from autonomic engine 30.

In an embodiment, autonomies engine 30 may be one or more computers running one or more software modules that perform the functions listed above. For example, in an embodiment, autonomics engine 30 may a single computer that runs one or more software modules that perform the various functions listed above. On other hand, autonomics engine 30 may include multiple computers linked to each other and running software modules that perform the functions above. The computers used as autonomics engine 30 may be generic or specialized computers including components such as, for example, a CPU (Central Processing Unit), RAM (Random Access Memory), ROM (Read Only Memory) and I/O devices.

Autonomics engine 30 may exchange information with context 40. Context 40 is a set of data structures that may contain information regarding the application of the monitoring policy. The stored data may represent rules, data collected from monitored elements 60, thresholds, computer names, etc. The context may be changed manually through the user interface 20 or in the actions of an Action Rule. In an embodiment, context 40 may be implemented on the same computer running autonomics engine 30 or alternatively on another computer separate from the one running autonomics engine 30.

Autonomics engine 30 may also be in bidirectional communication with each monitoring agent 50. In an embodiment, each monitoring agent 50 may be software processes that run on various computer systems. Furthermore, each monitoring agent 50 may be capable of monitoring for a given condition on one or more monitored element 60 and report when the condition is met by monitored element 60. These conditions may be, for example, thresholds, Boolean conditions, and other such variables. In addition, each monitoring agent 50 may start and stop monitoring a monitored element 60 based on the Action Rule and the condition of monitored element 60.

Each monitoring agent 50 may be configured to be in communication with one or more monitored elements 60. Monitored Elements 60 are distinct elements whose status influence the behavior of a distributed system and can be collected by corresponding software monitoring agents 50 on various computer systems. In an embodiment, monitored elements 60 may be a hardware component, a software component, or any combination of the two in the monitored system. For example, in a computer system being monitored, monitored elements 60 may be a web server or an other application running on a server.

As described above, the status of monitored element 60 may cause the behavior of the overall system to change. For example, as indicated in an Action Rule above, if the web tier of application X in a computer system gets saturated, autonomies engine 30 may automatically run a remediation workflow to provision a new virtual machine. In another example, if a web tier server is under used, an Action Rule will allow it to accept new connections.

Each monitored element 60 is associated with one or more variables which help define the status of monitored element 60. These variables may include, for example, a monitored condition of monitored element 60 and a state of monitored element 60. Furthermore, the variables associated with monitored element 60 may be controlled automatically by autonomics engine 30 via Action Rules or may be controlled manually through user interface 20.

A monitored condition is a first order logic expression based on the status of one or more monitored elements 60, on context 40, and on a date and time. For example, the relation of the total number of concurrent connections serviced by a web server within a specified time duration on a particular day to a threshold level which may be specified in context 40 may constitute a monitored condition for the web server. In addition, automatic states for monitored elements 60 may be defined by a monitored condition. The system may control the automatic state of monitored element 60 via one or more Action Rules.

Action Rules include a set of actions that need to be executed based on a Boolean condition on the states and on a monitoring condition. These actions include the ability to perform one or more of the following: set or reset the State; enable or disable Action Rules; run an external process or a remediation workflow; and change elements of the context. Thus, in an embodiment, when a web server services more than a threshold number of concurrent connections for a predefined period of time, an Action Rule may run a remediation workflow to provision a new virtual machine automatically without any intervention from a user. On the other hand, monitored element 60 may also have a user controlled state. A user controlled state may be a single Boolean value that is set/reset by a user, in an Action Rule as mentioned above, or by some external system.

By use of autonomies engine 30 that formulates and executes Action Rules to self-heal a system based on policies set forth through user interface 20, system 10 may be considered to be an Adaptive Declarative Monitoring system. Adaptive Monitoring to be implemented through user interface 20 is the ability to monitor only the necessary monitored elements 60 given an overall state of system 10 composed of the status of every state (Automatic or User Controlled) of every monitored element 60 and the current context 40. Declarative Monitoring allows Adaptive Monitoring to be implemented through user interface 20 without having to logically program when to start/stop monitoring elements on the components of the overall system 10.

Figure 2:
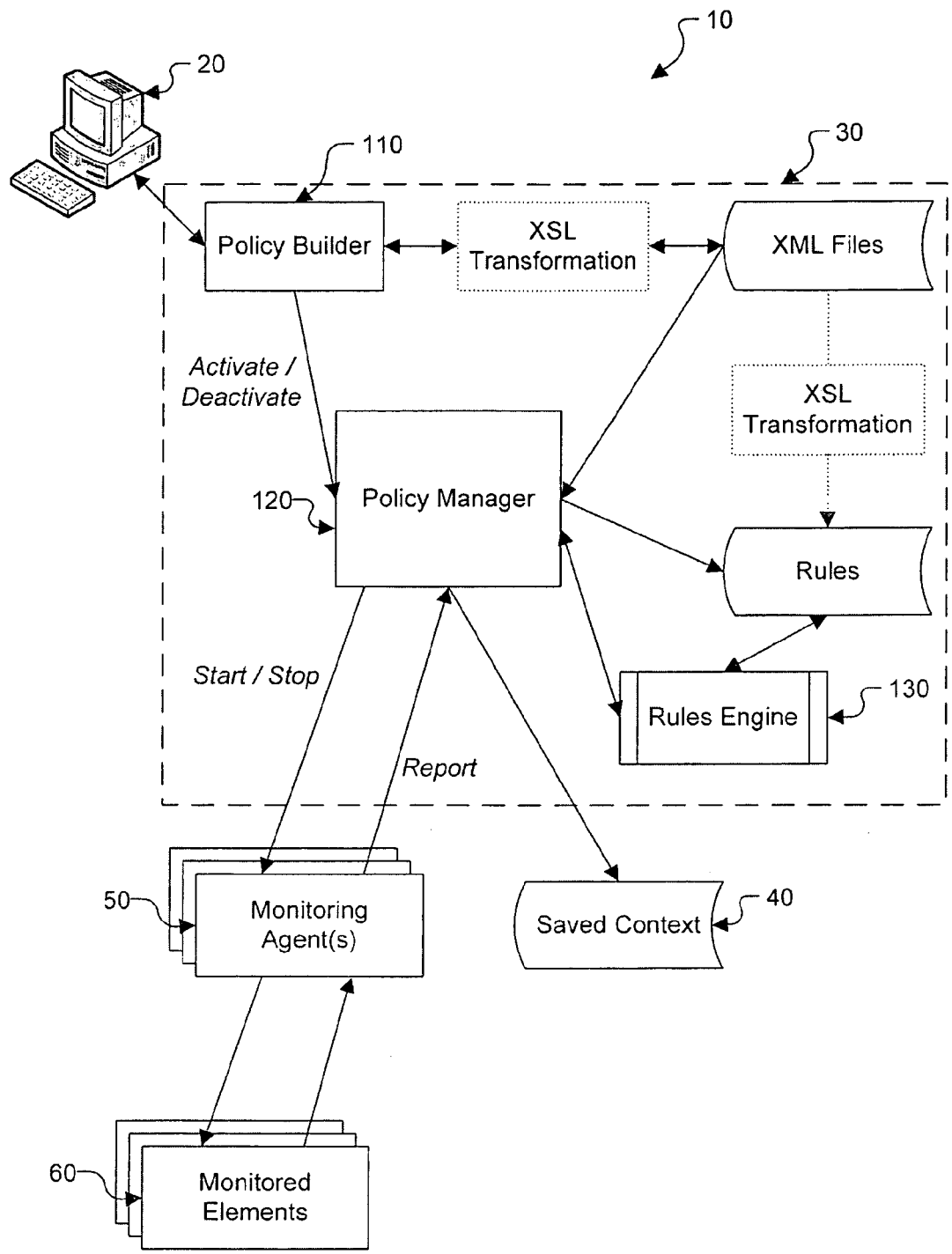
FIG. 2 illustrates a block diagram indicating the interaction between components of a declarative adaptive monitoring system according to an embodiment.

FIG. 2 illustrates a block diagram indicating the interaction between components of an adaptive monitoring system according to an embodiment. Specifically, FIG. 2 illustrates autonomies engine 30 in more detail. Autonomics engine 30 includes a policy builder 110, a policy manager 120, and a rules engine 130. In addition, context 40, monitoring agent 50, and monitored elements 60 are also part of system 10. Because context 40, monitoring agent 50, and monitored elements 60 have been discussed above, a repeat discussion of these components of system 10 will be omitted to avoid confusion.

In an embodiment, user interface 20 accesses policy builder 110 that is part of autonomics engine 30 to define monitoring policies. Policy builder 110 may be a GUI software running on a generic computer or specialized computer, and may be available online as a computer application. They syntax and semantics of the definitions in the monitoring policies may be saved in XML (Extensible Markup Language) files. XML is a flexible way to create common information formats and share both the format and the data on the World Wide Web, intranets, and elsewhere. XML is a formal recommendation from the World Wide Web Consortium. Using policy builder 110 a context 40, the state of monitored element 60 and Action Rules may be specified through user interface 20. The states and Action Rules may be translated to XML data using XSL transformations and may be saved persistently on system 10. Furthermore, user interface 20 may be used to activate and deactivate a monitoring policy from the GUI of policy builder 110.

Policy manager 120 is also a part of autonomies engine 30. Policy manager 120 may be a separate software process that runs on the same computer that runs policy builder 110. On the other hand, policy manager 120 may run on a separate computer that hosts policy builder 110. Of course policy manager 120 and policy builder 110 can be integrated into a single software process. Policy manager 120 may convert the XML definitions of the policies entered through user interface 20 into execution rules using XSLT (XSL Transformations). XSLT is a standard way to describe how to transform (change) the structure of an XML (Extensible Markup language) document into a document with a different structure. XSLT is a recommendation of the World Wide Web Consortium. Policy manager 120 uses XSLT to produce a dynamic rule-based application suitable for execution by rules engine 130. Based on the rule execution by rules engine 130, policy manager 120 may communicate with monitoring agent 50 to start and stop monitoring individual monitored elements 60. Monitoring agent 50 may report back to policy manager 120 with updated data once the monitoring condition on monitored element 60 is met.

In an embodiment, when user interface 20 is used to activate a monitoring policy, policy manager 120 may load the currently active XML files that contain the monitoring policy and use XSL transformations to generate rules in the syntax of rules engine 130. For example, two sets of rules may be generated for each automatic state of monitored element 60.

(1) For every monitored element 60 referenced in the monitoring condition of its automatic state, generate the following rule in the Rules Engine Syntax, using an XSL Transformation:
if
element is not monitored on corresponding monitoring agent and policy is activated
then
send a request to the corresponding Monitoring Agent to start monitoring it (2) For every monitored element 60 referenced in the monitoring condition of its automatic state, generate the following rule in the Rules Engine Syntax, using an XSL Transformation:
if
element is monitored on corresponding Monitoring Agent and policy is de-activated
then
send a request to the corresponding Monitoring Agent to stop monitoring it.

Other such rules may be generated for each automatic state of monitored element 60 without departing from the scope of this disclosure.

Rules engine 130 may be a generally available computer software process capable of inferring logical consequences from a set of asserted facts and a set of rules. Several rule engines are available, including commercial and open source choices. Commercial rules engines usually let a user interface 20 to express rules in a proprietary English-like language. Rules engine 130 may receive XSL transformed rules from policy manager 120 and may create dynamic code that can be executed without run-time compilation.

Rules engine 130 evaluates the Action Rules when a monitoring policy is either activated or deactivated or a report is received from monitoring agent 50. The evaluation may include: asserting facts; if the facts are true, then rules engine 130 may trigger actions; the actions may change information to be stored in context 40, hence changing facts; and the context may be saved for recovery. For example, rules engine 130 may trigger the following three different actions based on the state of monitored element 60, whether a monitoring policy is activated or deactivated, and whether monitored element 60 is actually being monitored or not monitored. The actions are indicated in the rules below in the "then" section.

(1) For every monitored element 60 referenced in the monitoring condition of the Action Rule, generate the following rule in the Rules Engine Syntax, using an XSL Transformation:
if
element is not monitored on corresponding Monitoring Agent and policy is activated and Boolean expression of States is true
then
send a request to the corresponding Monitoring Agent to start monitoring it.

(2) For every monitored element 60 referenced in the Monitoring Condition of the Action Rule, generate the following rule in the Rules Engine Syntax, using an XSL Transformation:
if
element is monitored on corresponding Monitoring Agent and either policy is de-activated or Boolean expression of States is false
then
send a request to the corresponding Monitoring Agent to stop monitoring it.

(3) Generate the following rule in the Rules Engine Syntax, using an XSL Transformation:
if
Monitoring Condition is true and policy is activated and Boolean expression of States is true
then
execute the appropriate actions specified by the monitoring policy.

Monitoring agent 50 may be an independent computer software process that runs on various computers. Monitoring agent 50 may be able to start and stop monitoring for a specific condition that needs to be met by monitored element 60. Once the condition has been met, monitoring agent 50 may return the information back to policy manager 120 with the updated context. Policy manager 120 and monitoring agent 50 may communicate with each other using standard data networking communication protocols such as TCP/IP, UDP/IP, etc.

Of course, two or more of policy manager 120, policy builder 110, rules engine 130 and/or monitoring agents 50 may be integrated into the same software process.

Figure 3:
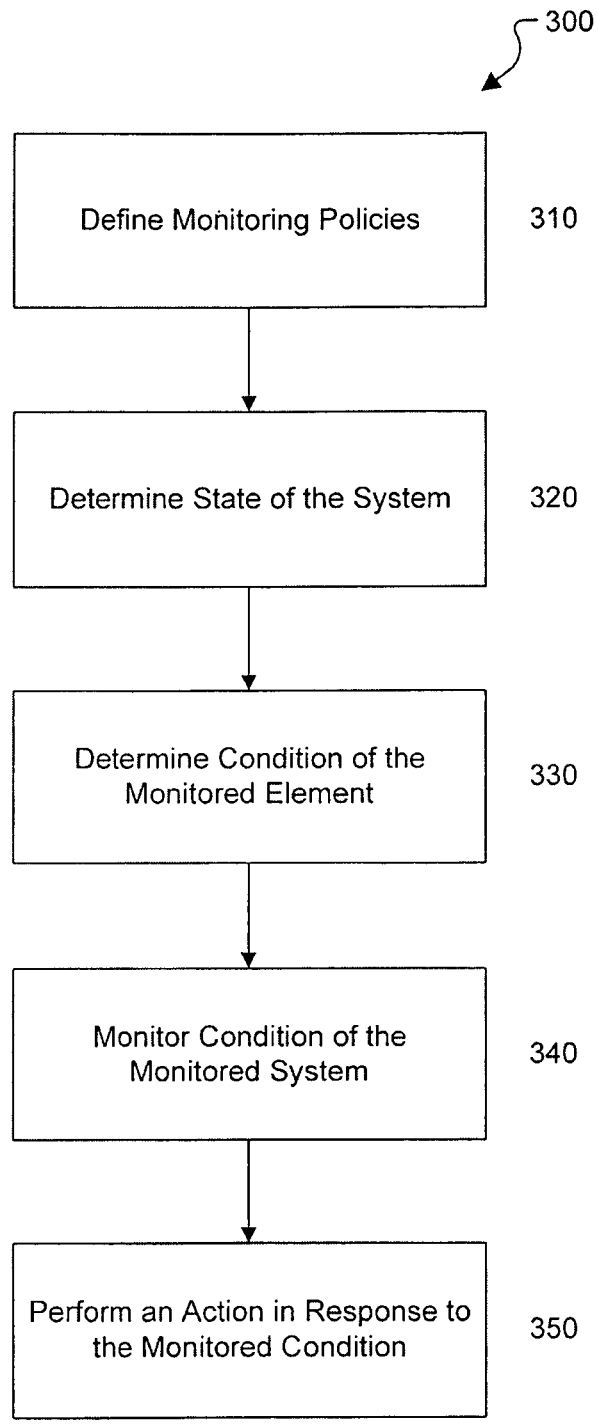
FIG. 3 illustrates a flow chart indicating the steps taken to implement an adaptive declarative monitoring system according to an embodiment.

FIG. 3 illustrates a flow chart 300 indicating the steps taken to implement an adaptive monitoring system according to an embodiment. At step 310, a user defines a monitoring policy for a computer system that needs to be monitored. At step 320, a status of a state of the computer system is determined relative to the monitoring policy. At step 330, a condition of a monitored element to be monitored in the computer system is determined based on the status of the state of the computer system. At step 340, the condition of the monitored element is monitored based on the monitoring policy. At step 350, action is performed based on the results of the monitoring and on a predetermined status of the monitored element.

While the present disclosure has been described in connection with the illustrated embodiments, it will be appreciated and understood that modifications may be made without departing from the spirit and scope of the disclosure.

What is claimed is:

1. A method of monitoring a computer system comprising;
defining a monitoring policy for the computer system, the monitoring policy comprising at least one self-healing action rule;
selecting at least one monitored element from among a plurality of elements of the computer system that is necessary to be monitored to determine an operating condition of the at least one monitored element, wherein the selecting is responsive to data structures containing information for applying the monitoring policy;

monitoring, with the computer system, the operating condition of the at least one monitored element based on the monitoring policy; and performing, with the computer system, at least one action that executes the at least one self-healing action rule to modify at least one operation of the computer system in response to the operating condition having a predetermined status, the at least one action causing the operating condition to no longer have the predetermined status, wherein the monitoring comprises selectively starting or stopping monitoring of the at least one monitored element responsive to the at least one self-healing action rule and the operating condition.

2. The method of claim 1, wherein the defining of the monitoring policy includes defining Action Rules, states and contexts, the determining of the operating condition is based on the context, and the performing is based on the Action Rules.

3. The method of claim 2, wherein the context comprises data including rules, data collected from monitored elements, thresholds, and/or computer names.

4. The method of claim 1, wherein the performing includes setting or resetting a state, or enabling or disabling the performing.

5. The method of claim 4, wherein the state is defined by the operating condition being monitored or an action of a user.

6. The method of claim 1, wherein the defining of the monitoring policy is performed using natural language, and wherein the performing further comprises:

translating the monitoring policy into an extensible markup language (XML) format from the natural language; and generating at least two sets of rules for each state of a monitored element responsive to the monitoring policy stored in the XML format.

7. The method of claim 6, wherein the at least two sets of rules comprises:

sending a request to a monitoring agent to start monitoring a referenced monitoring element responsive to a determination that the referenced monitoring element is not monitored and the monitoring policy is activated; and sending a request to the monitoring agent to stop monitoring the referenced monitoring element responsive to a determination that the referenced monitoring element is monitored and the monitoring policy is de-activated.

8. The method of claim 6, wherein the at least two sets of rules comprises:

sending a request to a monitoring agent to start monitoring a referenced monitoring element responsive to a determination that the referenced monitoring element is not monitored, the monitoring policy is activated and a Boolean expression of a state of the referenced monitoring element is met;

sending a request to the monitoring agent to stop monitoring the referenced monitoring element responsive to a determination that the referenced monitoring element is monitored, the monitoring policy is de-activated and a Boolean expression of a state of the referenced monitoring element is not met; and executing actions specified by the monitoring policy responsive to a determination that the referenced monitoring element is monitored, the monitoring policy is activated and a Boolean expression of a state of the referenced monitoring element is true.

9. The method of claim 8, further comprising:
returning information to a policy manager responsive to a determination that the operating condition has been met.

10. The method of claim 1, wherein the operating condition of the at least one monitored element is a utilization of the at least one monitored element.

11. The method of claim 10, wherein the monitoring includes checking the utilization of the at least one monitored element and comparing the utilization against a predetermined threshold.

12. The method of claim 1, wherein the at least one monitored element is a web tier of an application running on the computer system or a web server, and executing the at least one self-healing action rule comprises:

determining whether the web tier or web server is saturated, wherein the web tier or web server is saturated when a number of connections meets a connection threshold during a threshold period of time;

unprovisioning a predetermined portion of the web tier or web server and/or accepting new connections responsive to a determination that the web tier or web server is not saturated; and running a remediation workflow to provision a new virtual machine responsive to a determination that the web tier or web server is saturated.

13. The method of claim 1, wherein defining the monitoring policy includes consolidating monitoring requirements of a plurality of active management policies.

14. The method of claim 1, wherein the operating condition is a threshold, a Boolean condition, and/or a variable.

15. The method of claim 1, wherein the monitored element is a hardware component, a software component, and/or a combination of a hardware component and a software component.

16. A computer system comprising:

a policy builder module of the computer system constructed and arranged to create a monitoring policy for the computer system, the monitoring policy comprising at least one self-healing action rule;

a policy manager module of the computer system constructed and arranged to determine an operating condition to be monitored in the computer system based on the monitoring policy;

a rules engine module of the computer system constructed and arranged to select at least one monitored element from among a plurality of elements of the computer system that is necessary to be monitored to determine the operating condition responsive to data structures containing information for applying the monitoring policy; and a monitoring agent module of the computer system constructed and arranged to monitor the operating condition of the at least one monitored element, wherein the monitoring agent is further arranged to selectively start or stop monitoring of the at least one monitored element responsive to the at least one self-healing action rule and the operating condition, wherein the rules engine module of the computer system, responsive to the monitoring of the monitoring agent module, is constructed and arranged to perform at least one action that executes the at least one self-healing action rule to modify at least one operation of the computer system in response to the operating condition monitored by the monitoring agent module having a predetermined status, the at least one action causing the operating condition to no longer have the predetermined status.

17. The computer system of claim 16, wherein the policy manager module is constructed and arranged to create Action Rules, states and contexts as the monitoring policy, wherein the operating condition determined by the policy manager is based on the context and the rules engine performs the action based on the Action Rules.

18. The computer system of claim 17, wherein the context comprises data including rules, data collected from monitored elements, thresholds, and/or computer names.

19. The computer system of claim 16, wherein action performed by the rules engine module includes setting or resetting a state, or enabling or disabling the performing.

20. The computer system of claim 19, wherein the policy manager module determines a status of the state based on the operating condition being monitored or an action of a user.

21. The computer system of claim 16, wherein the policy builder module creates the monitoring policy based on natural language input to the policy builder module in natural languages, and wherein the policy manager module:
translates the monitoring policy into an extensible markup language (XML) format from the natural language; and
generates at least two sets of rules for each state of a monitored element responsive to the monitoring policy stored in the XML format.

22. The computer system of claim 21, wherein the at least two sets of rules comprises:
sending a request to a monitoring agent to start monitoring a referenced monitoring element responsive to a determination that the referenced monitoring element is not monitored and the monitoring policy is activated; and
sending a request to the monitoring agent to stop monitoring the referenced monitoring element responsive to a determination that the referenced monitoring element is monitored and the monitoring policy is de-activated.

23. The computer system of claim 21, wherein the at least two sets of rules comprises:
sending a request to a monitoring agent to start monitoring a referenced monitoring element responsive to a determination that the referenced monitoring element is not monitored, the monitoring policy is activated and a Boolean expression of a state of the referenced monitoring element is met;
sending a request to the monitoring agent to stop monitoring the referenced monitoring element responsive to a determination that the referenced monitoring element is monitored, the monitoring policy is de-activated and a Boolean expression of a state of the referenced monitoring element is not met; and
executing actions specified by the monitoring policy responsive to a determination that the referenced monitoring element is monitored, the monitoring policy is activated and a Boolean expression of a state of the referenced monitoring element is true.

24. The computer system of claim 16, wherein the at least one monitored element is a web tier of an application running on the computer system, and wherein the rules engine module:
determines whether the web tier or web server is saturated, wherein the web tier or web server is saturated when a number of connections meets a connection threshold during a threshold period of time;
unprovisions a predetermined portion of the web tier or web server and/or accepting new connections responsive to a determination that the web tier or web server is not saturated; and
runs a remediation workflow to provision a new virtual machine responsive to a determination that the web tier or web server is saturated.

25. The computer system of claim 16, wherein the monitoring agent module checks the utilization of the at least one monitored element and compares the utilization against a predetermined threshold.

26. The computer system of claim 16, wherein creating the monitoring policy includes consolidating monitoring requirements of a plurality of active management policies.

27. The computer system of claim 16, wherein the operating condition is a threshold, a Boolean condition, and/or a variable.

28. The computer system of claim 16, wherein the monitored element is a hardware component, a software component, and/or a combination of a hardware component and a software component.

* * * * *